United States Patent [19]
Thompson et al.

[11] Patent Number: 5,526,795
[45] Date of Patent: Jun. 18, 1996

[54] HIGH PRESSURE PUMPLESS FUEL SYSTEM

[75] Inventors: Robert H. Thompson, Redford; Michael J. Harrigan, Ann Arbor, both of Mich.

[73] Assignee: Ford Motor Company, Dearborn, Mich.

[21] Appl. No.: 208,552

[22] Filed: Mar. 10, 1994

[51] Int. Cl.⁶ ................................................ F02M 37/04
[52] U.S. Cl. ........................... 123/516; 220/530; 222/389
[58] Field of Search .................... 123/516, 518, 123/510, 527; 220/530, 529, 534, 535, 536, 538–539; 222/389

[56] References Cited

U.S. PATENT DOCUMENTS

| | | | |
|---|---|---|---|
| 2,297,238 | 9/1942 | Neugebauer et al. | 123/516 |
| 2,579,023 | 12/1951 | Thomas, Jr. | 123/516 |
| 2,611,512 | 9/1952 | Fashay | 220/530 |
| 2,628,673 | 2/1953 | Ericson | 220/530 |
| 3,043,340 | 7/1962 | Rehbock | 222/339 |
| 3,592,175 | 7/1971 | Hamilton | 123/495 |
| 3,617,034 | 11/1971 | Skinner | 123/518 |
| 3,633,609 | 1/1972 | Benner et al. | 137/351 |
| 3,842,939 | 10/1974 | Satzinger | 222/389 |
| 3,854,911 | 12/1974 | Walker | 123/519 |
| 3,949,720 | 4/1976 | Zipprich et al. | 123/518 |
| 3,977,379 | 8/1976 | Weissenback | 123/518 |
| 4,164,919 | 8/1979 | Davis et al. | 123/434 |
| 4,167,874 | 9/1979 | Grant | 73/290 R |
| 4,172,538 | 10/1979 | Thelberg | 222/389 |
| 4,430,978 | 2/1984 | Lewis et al. | 123/527 |
| 4,648,523 | 3/1987 | Strock | 220/530 |
| 4,721,235 | 1/1988 | Watson | 222/389 |
| 4,852,765 | 8/1989 | Lyzohub | 220/530 |
| 4,966,299 | 10/1990 | Teets et al. | 123/516 |
| 5,056,493 | 10/1991 | Holzer | 123/518 |
| 5,063,891 | 11/1991 | Noisier | 123/516 |
| 5,183,087 | 2/1993 | Aubel et al. | 123/518 |
| 5,209,210 | 5/1993 | Ikeda et al. | 123/516 |
| 5,215,132 | 6/1993 | Kobayashi | 123/518 |

FOREIGN PATENT DOCUMENTS

| | | |
|---|---|---|
| 3817998 | 12/1989 | Germany. |
| 3916574 | 11/1990 | Germany. |

*Primary Examiner*—Thomas N. Moulis
*Attorney, Agent, or Firm*—David B. Kelley; Roger L. May

[57] ABSTRACT

A fuel delivery system for an internal combustion engine has a fuel tank with a piston movably mounted on a guide rod therein to separate the tank into two variable volumes, one for containing fuel and the other for containing pressurized air to act on the piston for compressably pressurizing the fuel, thus preventing fuel vaporization during normal fuel delivery. Pressurized air is provided to the pressure volume by an air regulator or a positive displacement pump, either of which can be controlled by a microprocessor based electronic engine control unit. A filler pipe attached to the tank has at least one anti-expulsion valve therein and pressure interlock means for preventing fuel expulsion through the filler pipe when the tank is pressurized. A pressure accumulator is connected to the fuel line to assist in providing a constant fuel pressure to the engine.

16 Claims, 3 Drawing Sheets

HIGH PRESSURE PUMPLESS FUEL SYSTEM

FIELD OF THE INVENTION

The present invention pertains to automotive fuel delivery systems and, more particularly, to a system for delivering fuel to an internal combustion engine at high pressure without using a conventional fuel pump.

BACKGROUND OF THE INVENTION

Automobiles have long employed pumps for delivering fuel from a fuel tank to an internal combustion engine. For example, early automotive applications used mechanically actuated diaphragm type pumps mounted directly to the engine; these pumps "pulled" fuel from the fuel tank to the pump and then "pushed" it to the carburetor for mixture with air prior to being delivered to the engine's cylinders for combustion. Current fuel pumps are usually mounted within the fuel tank, and deliver fuel to the fuel injector(s) at high pressures (40 psi) through various rotary means, such as an impeller or gerotor. These pumps, however, often cavitate thus producing undesirable fuel vapor bubbles within the fuel which reduces engine performance and decreases efficiency.

An additional problem with present fuel delivery systems is fuel vaporization. Fuel stored within the fuel tank evaporates and the vapor collects above the fuel in the tank. Normal diurnal temperature changes and returned, unused hot fuel (in recirculating fuel delivery systems) accelerate this fuel vaporization. As a result of governmental regulation of emissions of this fuel vapor, automobile manufacturers have devised numerous methods and apparatus for the storage and handling of fuel vapor which would otherwise escape to the atmosphere, both during operation and upon refueling, or during vehicle operation. Such apparatus adds to vehicle expense by increasing research, engineering, design, manufacturing and assembly costs.

SUMMARY OF THE INVENTION

The present invention will, to a great extent, eliminate fuel vaporization within a fuel storage tank thus reducing the size of vapor storage and handling apparatus. In addition, the present invention will supply pressurized fuel to the engine without use of a conventional fuel pump and the concomitant vaporization and cavitation problems described above. These advantages are achieved by providing a system for delivering fuel from a fuel tank to an internal combustion engine, with the system comprising a means for filling the fuel tank with said fuel, such as a filler pipe, means for conducting fuel from the fuel tank to the engine, such as a fuel line, and means for compressably pressurizing the entire quantity of fuel within the fuel tank, so that fuel is delivered under pressure to the engine, and so that vaporization of the fuel is reduced.

The means for compressably pressurizing the fuel can be, for example, a piston sealably mounted within the fuel tank which divides the tank into a first variable volume chamber for containing fuel, and a second variable volume chamber void of fuel, with the position of the piston within the fuel tank determined by positioning means responsive to pressure in the inlet manifold and the fuel line.

The positioning means preferably comprises guide means fixedly attached to the fuel tank with the piston movably fitted thereon for movement relative to the fuel tank, clutch means carried on the piston and mounted on the guide means for allowing the piston to move along the guide means toward the first chamber to compress fuel therein, means for controllably pressurizing the second chamber, means for releasing the clutch means so that the piston slides along the guide means toward the second chamber when pressure therein is less than pressure in the first chamber, and means for depressurizing the second chamber upon removal of a filler pipe cover means for refueling. The pressure within the second chamber can be supplied by either an air regulator or a variable displacement pump which can be controlled by an engine control unit containing a microprocessor.

Thus, an object of the present invention is to provide a fuel delivery system which supplies pressurized fuel to an internal combustion engine without use of a conventional fuel pump.

Another object of the present invention is to provide a fuel delivery system which significantly reduces fuel vaporization by pressurizing the bulk of fuel within the fuel tank.

Still another object of the present invention is to provide a fuel delivery system having a piston which pressurizes fuel within the fuel tank to deliver it to the engine and to reduce vaporization.

Yet another object of the present invention is to provide a fuel delivery system which allows more precise fuel level indication than conventional fuel sender units.

DETAILED DESCRIPTION OF THE PREFERRED EMBODIMENTS

Figure 1:
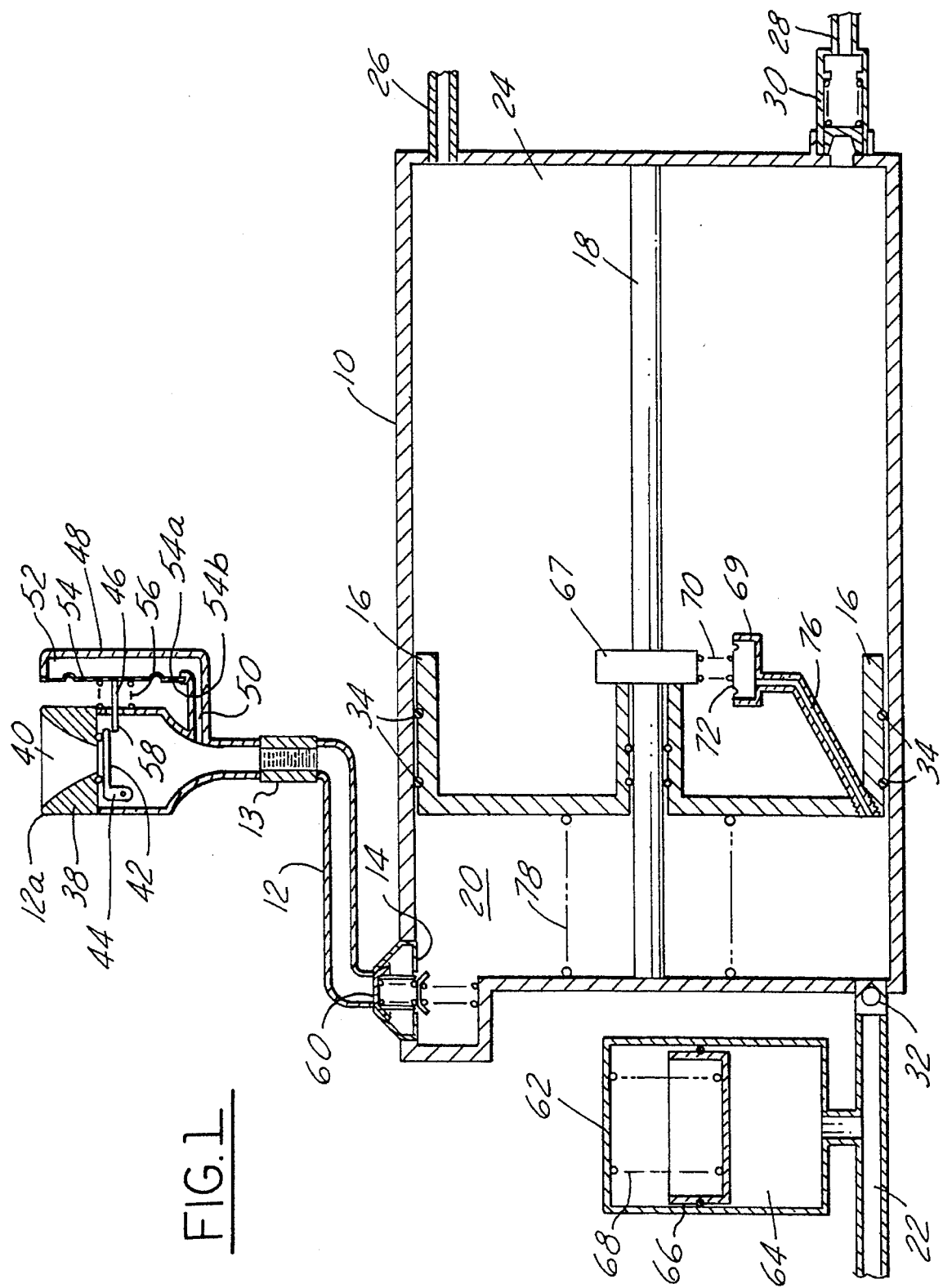
FIG. 1 is a schematic diagram of a fuel delivery system according to the present invention showing a fuel tank having a pressure-operated piston for pressurizing fuel in the fuel tank and through a fuel line.

Referring to FIG. 1 until stated otherwise, a schematic of the preferred embodiment of the present invention is shown. A fuel tank 10 has filler pipe 12 connected to an opening 14 for filling tank 10 with fuel. A movable piston 16 is sealably mounted within tank 10, preferably on a tube or guide rod, 18, so that two variable volume non-communicating sections are created. Variable volume fuel section 20, which normally contains fuel, is in fluid communication with filler pipe 12 and fuel line 22, which carries pressurized fuel to the engine (not shown). Variable volume pressure section 24 is in fluid communication with pressure supply line 26 and pressure relief line. A one-way check valve 30 in pressure relief line 28 allows fluid or gas to flow out of pressure section 4, and a similar one-way fuel line check valve 32 allows fuel to flow from fuel section 20 to fuel line 22, but not vice-versa.

Piston 16 has tank seals 34 and guide rod seals 36 to prevent leakage from fuel section 20 to pressure section 24. Under normal fuel delivery conditions, pressure section 24 is pressurized so that such leakage will not occur. However, when fuel tank 10 must be refueled, pressure section 24 is depressurized and fuel may leak past piston 16 if left unsealed.

Fuel enters tank 10 via filler pipe 12 and fuel filter 13 when pressure volume 24 is depressurized. Filler pipe 12 has a nozzle receiving end 12a with fuel nozzle receiving funnel 38. As the filler pump nozzle (not shown) is inserted into nozzle inlet 40, it is directed by funnel 38 toward flapper door 42 which is spring biased to block inlet 40, preferably by a spring loaded hinge, such as hinge 44. If locking rod 46 is in the locked position (as shown in FIG. 1), flapper door 42 is prevented from pivoting on hinge 44 and thus cannot open. Such a condition occurs when pressurized air from filler pipe 12 passes into pressure interlock 48 through sensing line 50.

Pressure interlock 48 has an enclosed chamber 52 in fluid communication with filler pipe 12 through pressure sensing line 50. Chamber 52 has diaphragm 54 with inner side 54a facing the interior of chamber 52 and outer side 54b exposed to atmospheric pressure. One end of diaphragm biasing spring 56 is fixed to filler pipe 12 and the other end is attached to outer side 54b of diaphragm 54. Locking rod 46 is attached at one end to side 54b of diaphragm 54, and passes through sealed orifice 58 in nozzle receiving end 12a to the interior of filler pipe 12. Thus, when pressure within chamber 52 is sufficient to push inner side 54a toward filler pipe 12, locking rod 46 slides through orifice 58 to a side of flapper door 42 opposite inlet 40, thus preventing flapper door 42 from pivoting open in a direction away from inlet 40.

When filler pipe 12 is exposed to atmospheric pressure, the pressure in chamber 52 becomes atmospheric pressure thus equalizing the pressure on either side of diaphragm 54 allowing diaphragm spring 56 to force locking rod 46 to withdraw from the blocking position and allow flapper door 42 to pivot open away from inlet 40 upon insertion of a fuel filler nozzle (not shown).

To prevent fuel from being forced through filler pipe 12 when fuel within fuel volume 20 is pressurized, at least one anti-expulsion valve 60 is positioned between fuel pipe 12 and fuel tank 10, and preferably near tank opening 14. Anti-expulsion valve 60 can be a one-way check valve or any anti-expulsion device known to those skilled in the art and suggested by this disclosure.

A pressure accumulator 62, which can be any suitable pressure accumulating mechanism used in the art, is connected in fluid communication to fuel line 22 between one-way valve 32 and the engine (not shown) for maintaining a constant fuel pressure. Accumulator 62 essentially comprises a reservoir 64 with a compression device, such as accumulator piston 66, biased by accumulator spring 68 toward reservoir 64. When fuel pressure in fuel line 22 begins to fall below that which is desired, such as during rapid acceleration or at engine start-up, accumulator piston 66 forces fuel from reservoir 64 to fuel line 22 until pressure within tank 10 delivers fuel at the desired pressure and flow rate. Additionally, when fuel pressure in fuel line 22 rises rapidly, or "spikes", during sudden deceleration, reservoir 64 receives fuel from fuel line 22 and accumulator piston 66 is forced toward accumulator spring 68.

Clutch 67 is carried on piston 16 for movement along guide rod 18, and may be comprised of a plate (not shown) which is forced against guide rod 18. Clutch 67 allows piston 16 to move freely toward fuel volume 20 to compress fuel therein, but prevents movement toward pressure volume 24. A clutch release mechanism 69 is mounted to clutch 67 for movement therewith and, when engaged, allows piston 16 to move toward pressure volume 24, for example, during refueling.

Clutch release mechanism 69 may be comprised of a spring 70 attached at one end to clutch 67 and at the other end to diaphragm 72 of cell 74. Cell 74 is fluidly connected to fuel volume 20 by line 76 so that diaphragm 72, and thus spring 70, moves according to the differential pressure between fuel volume 20 and pressure volume 24. When pressure volume 24 is pressurized so as to force piston 16 to compress fuel within fuel volume 20, there is little, if any, differential pressure between fuel volume 20 and pressure volume 24. Diaphragm 72 thus remains in a relaxed position and spring 70 exerts no force on clutch 67 so that piston 16 movement is limited to that in the direction of fuel volume 20. When pressure volume 24 is depressurized, for example during refueling, the pressure in cell 74 exceeds that in pressure volume 24, and diaphragm 72 and spring 70 are forced toward clutch 67 to release the clutch plate (not shown). Piston 16 can then move toward pressure volume 24 to allow fuel to enter fuel volume 20 through filler pipe 12. Preferably, piston 16 is biased toward pressure volume 24 by piston spring 78.

The position of piston 16 within fuel tank 16 depends on whether pressure volume 24 is pressurized or depressurized. When pressure volume 24 is depressurized, piston spring 78 forces piston 16 toward pressure volume 24 since clutch release mechanism 68 has disengaged clutch 66 from guide rod 18 as described above. When pressure volume 24 is pressurized, piston 16 is forced toward fuel volume 20 to compress fuel therein thus forcing it through fuel line 22 to the engine (not shown).

Figure 2:
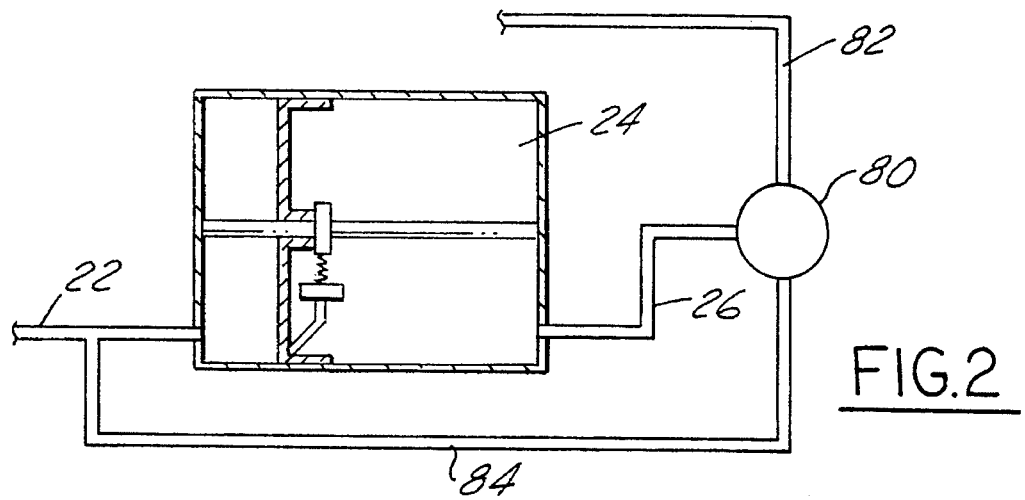
FIG. 2 is a schematic diagram of a fuel delivery system according to the present invention showing a variable displacement pressure pump connected to the fuel tank for supplying pressurized air to pressurize fuel within the tank.

Pressure volume 24 can be pressurized with an air delivery device 80, such as a conventional air compressor, as shown in FIG. 2. Ambient air is compressed by air compressor 80 and routed through pressure supply line 26 to pressure volume 24 for acting on piston 16 as described above. A feed-back pressure sensing line 84 is connected between fuel line 22 and regulator 80 so that fuel pressure can be compared to pressure in pressure volume 24 and manifold pressure from line 82 for closed-loop control, for example, by a microprocessor controlled electronic engine control unit 86.

Alternatively, air delivery device 80 can be a variable displacement pump which supplies pressurized air, or another fluid, to pressure volume 24 (FIG. 2). Fuel pressure is sensed through sensing line 84 and compared to manifold vacuum pressure as sensed by vacuum line 82 to set the appropriate air flow so that pressure volume 24 is adequately pressurized.

Figure 3:
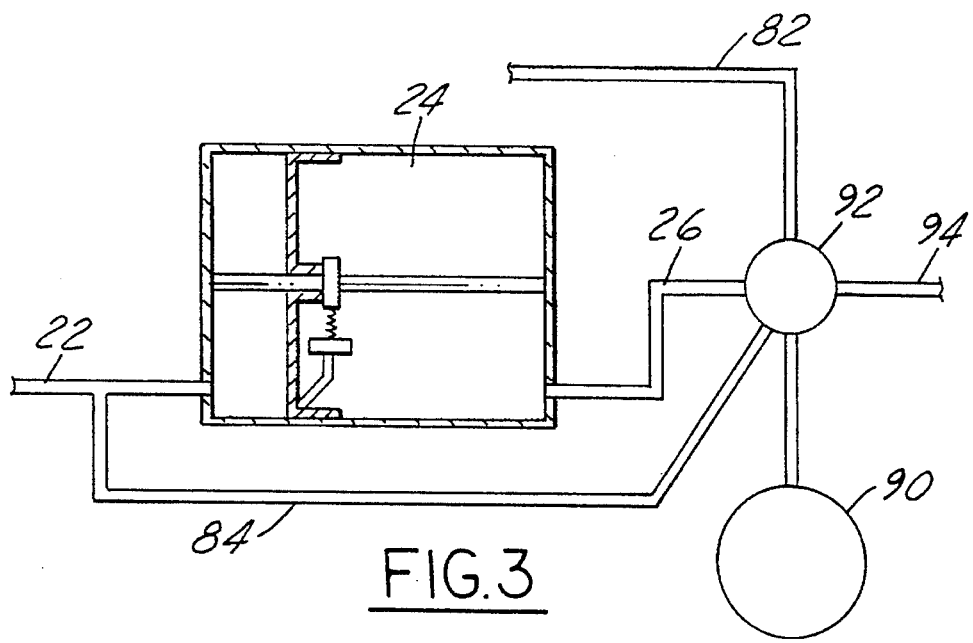
FIG. 3 is a schematic diagram of an alternative embodiment of the present invention showing a pressure regulator connected to the fuel tank for supplying pressurized air to pressurize fuel within the tank.
Figure 4:
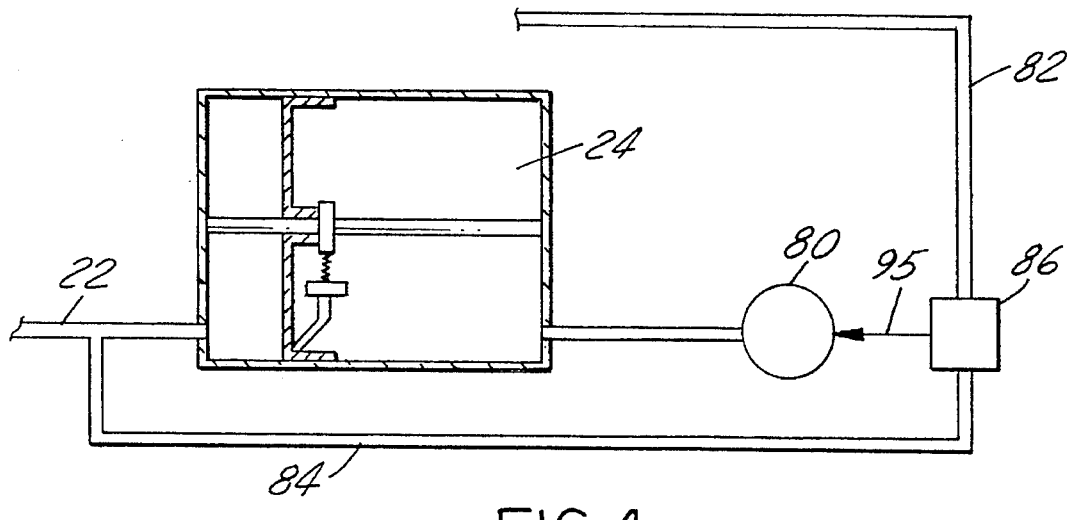
FIG. 4 is a schematic diagram of an alternative embodiment of the present invention showing a pressure regulator, operated by a pulse-width modulated signal from the engine control unit, connected to the fuel tank for supplying pressurized air to pressurize fuel within the tank.
Figure 5:
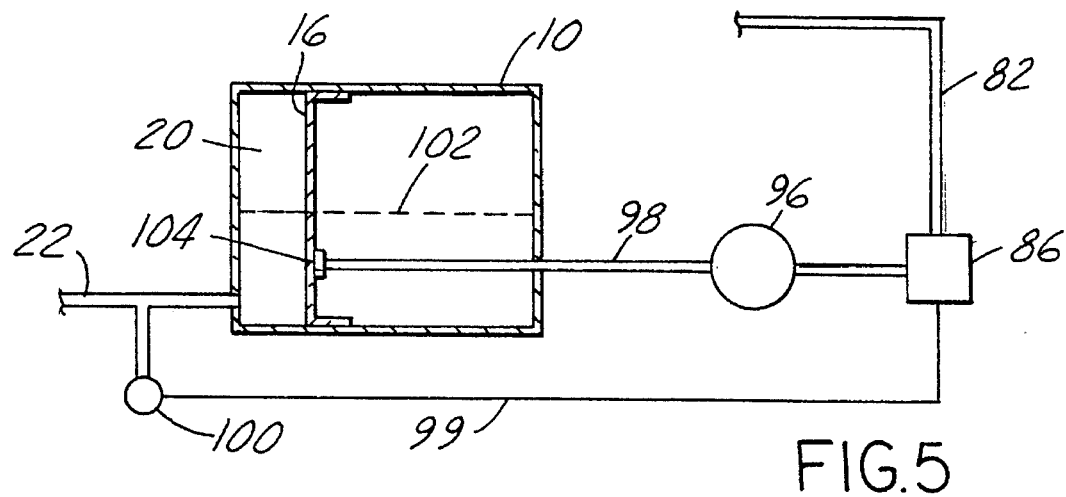
FIG. 5 is a schematic diagram of an alternative embodiment of the present invention showing a stepper motor having a screw for positioning the piston which pressurizes fuel within the tank.

Other alternative embodiments for pressurizing fuel within fuel volume 20 are shown in FIGS. 3 through 5. In FIG. 3, constant flow pump 90 delivers pressurized air to a regulator 92 which compares fuel line pressure through sensing line 84 and manifold pressure through vacuum line 82. Unneeded air is routed to air bypass line 94. FIG. 4 shows an air regulator 80 controlled by a pulse-width modulated signal 95 from an engine electronic control unit 86. As with the pressure control arrangements discussed above, fuel pressure in pressure line 84 is compared to manifold vacuum pressure in vacuum line 82 and an appropriate signal sent to air regulator 80.

In FIG. 5, stepper motor 96 screws and unscrews rod 98 which is attached to piston 16 to compressably pressurize fuel within fuel volume 20. Stepper motor 96 is electronically controlled, for example by engine electronic control unit 86, which may compare manifold vacuum pressure from vacuum line 82 to a fuel pressure signal 99 generated by pressure transducer 100. Rod 98 is positioned a distance below centerline 102 of fuel tank 10 to directly counter the average pressure of fuel in fuel volume 20 which acts on piston 16 at a point 104 due to the weight of the fuel.

Figure 6:
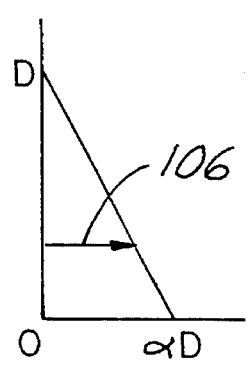
FIG. 6 is a graph showing the pressure distribution due to weight of fuel within the fuel tank versus depth within the fuel tank.

When fuel is being delivered through fuel line 22 in normal operation, the pressure of fuel within fuel volume 20 varies with depth in fuel tank 10, as seen in the graph of FIG. 6. Using fuel line 22 (FIG. 5) as a zero reference, the vertical axis in FIG. 6 represents height in fuel tank 10 above fuel line 22, while the horizontal axis represents pressure due to the fuel. At height D, the diameter of fuel tank 10, no column of fuel exists to exert pressure on piston 16. At fuel line 22, the pressure exerted on piston 16 is the specific gravity of the fuel, $\alpha$, multiplied by the height of the column of fuel above fuel line 22, D. The line extending between D on the vertical axis and $\alpha$D on the horizontal axis depicts the relationship between height and pressure due to fuel in fuel tank 10. Line 106, which represents the average pressure exerted on piston 16, is above the horizontal axis a distance equal to the distance of screw rod 98 above fuel line 22.

Refueling of fuel tank 10 is accomplished in the following ways. Referring to FIG. 1, when filler pipe 12 is uncapped, the pressure in pressure volume 24 is dumped through pressure relief valve 30 and pressure relief line 28 until a pressure of approximately atmospheric pressure is reached in fuel volume 20 and pressure volume 24. Clutch 66 controls movement of piston 16 as fuel is added to fuel volume 20 in the way described above.

Figure 7:
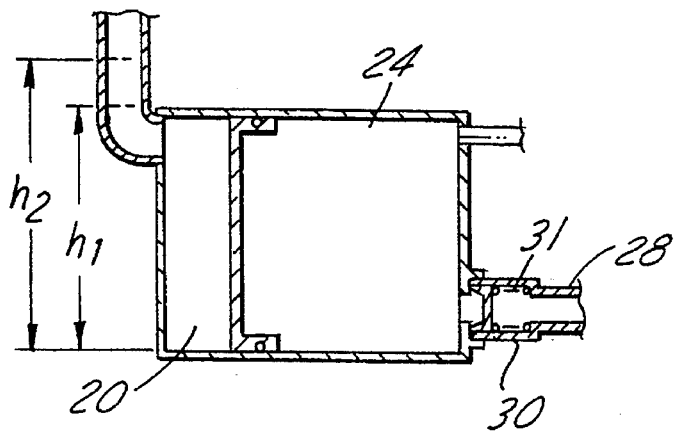
FIG. 7 is a schematic diagram of a fuel delivery system according to the present invention showing two fuel heights within the fuel tank.

An alternative configuration for controlling pressure within pressure volume 24 is shown in FIG. 7. Pressure relief valve 30 maintains pressure balance between fuel volume 20 and pressure volume 24. When filler pipe 12 is uncapped, the fuel level within fuel volume 20 will be at height $h_1$ as shown in FIG. 7 since pressure relief valve 30 controllably releases air from pressure volume 24 into pressure relief line 28 to maintain the pressure in pressure volume 24 at approximately the average pressure exerted by the fuel column in fuel volume 20 (line 106 in FIG. 6) as described above. Pressure interlock 48 (FIG. 1) then moves to the open position as described above to allow a fuel nozzle (not shown) to enter filler pipe 12 for delivery of fuel to fuel tank 10. As fuel flows into filler pipe 12, the fuel level in fuel volume 20 rises to height $h_2$ (FIG. 7) thus raising the pressure in fuel volume 20 and pressure volume 24. Pressure relief valve 30 opens to allow air flow out of pressure volume 24 when pressure in pressure volume 24 exceeds a pre-set value, determined by set spring 31.

With the system just described, high pressure fuel can be delivered to an internal combustion engine while avoiding the drawbacks of prior fuel pump based systems. Since piston 16 separates fuel tank 10 into two separate volumes, a fuel volume 20 and a pressure volume 24, fuel vaporization is significantly reduced, if not eliminated, by continually decreasing fuel volume 20 size as fuel is forced through fuel line 22 thus preventing fuel contact with the air in the remainder of tank 10.

Although the preferred embodiments of the present invention have been disclosed, various changes and modifications may be made without departing from the scope of the invention as set forth in the appended claims.

We claim:

1. A system for delivering fuel to an internal combustion engine, said system comprising:

a fuel tank;

means for filling said fuel tank with said fuel;

means for conducting said fuel from said fuel tank to said engine; and means for compressably pressurizing the entire quantity of said fuel within said fuel tank such that said fuel is delivered under pressure to said engine, and so that vaporization of said fuel is reduced, said means for compressably pressurizing comprising a piston sealably mounted within said fuel tank, said piston dividing said fuel tank into a first variable volume chamber for containing said fuel; and positioning means responsive to fuel pressure in said fuel tank in said fuel line for positioning said piston within said fuel tank, said positioning means comprising;

guide means fixedly attached to said fuel tank, with said piston movable fitted thereon for movement relative to said fuel tank;

clutch means attached to said piston to move along said guide means toward said first chamber to compress fuel therein;

means for controlling pressure within said second chamber;

means for releasing said clutch means so that said piston slides along said guide means toward said second chamber when pressure therein is less than pressure in said first chamber; and means for depressurizing said second chamber upon removal of a filler pipe cover means.

2. A fuel delivery system according to claim 1 wherein said means for controlling pressure within said second chamber comprises an electronic engine control unit.

3. A fuel delivery system according to claim 2, wherein said means for controlling pressure within said second chamber further comprises an air regulator, conduit means for delivering pressurized air from said regulator to said second chamber and for venting air from said second chamber, and means for sensing fuel pressure within said means for conducting connected to said regulator.

4. A fuel delivery system according to claim 2, wherein said means for controlling pressure within said second chamber further comprises a variable displacement pressure pump having conduit means in fluid communication with said second chamber for delivering pressurized fluid to said second chamber, and means for sensing fuel pressure within said means for conducting connected to said variable displacement pressure pump.

5. A fuel delivery system for delivering fuel to an internal combustion engine, said delivery system comprising:

a fuel tank;

a filler pipe in fluid communication with said fuel tank;

a fuel line for carrying fuel from said fuel tank to said engine;

means for pressurizing the entire quantity of said fuel within said fuel tank, said means for pressurizing comprising a piston sealably mounted within said fuel tank and dividing said fuel tank into a first variable volume chamber for containing said fuel, and a second variable volume chamber void of said fuel, with the position of said piston within said fuel tank determined by positioning means responsive to fuel pressure in said fuel tank line, said positioning means comprising:

guide means fixedly attached to said fuel tank, with said piston movably fitted thereon for movement relative to said fuel tank;

clutch means attached to said piston and mounted on said guide means for allowing said piston to move along said guide means toward said first chamber to compress fuel therein;

means for controlling pressure within said second chamber;

means for releasing said clutch means so that said piston slides along said guide means toward said second chamber when pressure therein is less than pressure in said first chamber; and means for depressurizing said second chamber upon removal of a filler pipe cover means for refueling.

6. A fuel delivery system according to claim 5, wherein said means for controlling pressure within said second chamber comprises an electronic engine control unit.

7. A fuel delivery system according to claim 6, wherein said means for controlling pressure within said second chamber further comprises an air regulator, conduit means for delivering pressurized air from said regulator to said second chamber and for venting air from said second chamber, and means for sensing fuel pressure within said means for conducting connected to said regulator.

8. A fuel delivery system according to claim 6, wherein said means for controlling pressure within said second chamber further comprises a variable displacement pressure pump having conduit means in fluid communication with said second chamber for delivering pressurized fluid to said second chamber, and means for sensing fuel pressure within said means for conducting connected to said variable displacement pressure pump.

9. A fuel delivery system according to claim 5, wherein said guide means comprises a guide rod.

10. A fuel delivery system according to claim 5, wherein a fuel pressure accumulator is attached to said fuel line between said fuel tank and said engine for maintaining a constant fuel pressure to said engine.

11. A fuel delivery system according to claim 10, wherein a one-way check valve is positioned in said fuel line between said fuel tank and said fuel pressure accumulator, said check valve allowing fuel flow from said fuel tank to said fuel line but preventing fuel flow from said fuel line to said fuel tank.

12. A fuel delivery system according to claim 5, wherein said filler pipe has an inlet, a flapper door sealingly biased so as to block said inlet, and pressure interlock means to prevent opening of said flapper door when air within said filler neck is pressurized.

13. A fuel delivery system according to claim 12, wherein said pressure interlock means comprises a locking rod connected to a diaphragm having a first side exposed to atmospheric pressure and a second side exposed to pressure within said filler pipe, said locking rod in a locked position preventing said flapper door from opening when said filler pipe contains pressurized air, and with said locking rod forced to an unlocked position which allows said flapper door to open by a biasing spring attached to said diaphragm when said filler pipe is exposed to atmospheric pressure.

14. A fuel delivery system according to claim 5, wherein at least one anti-expulsion valve is positioned between said fuel tank and said filler pipe to prevent expulsion of fuel from said fuel tank through said filler pipe.

15. A fuel delivery system according to claim 5, wherein said piston is biased toward said second chamber by a piston return spring within said first chamber attached to said fuel tank and to said piston.

16. A system for delivering fuel to an internal combustion engine, the system comprising:

a fuel tank;

means for filling the fuel tank with the fuel;

means for conducting the fuel from the fuel tank to the engine;

means for compressably pressurizing the entire quantity of the fuel within the fuel tank to a pressure above atmospheric pressure, such that the fuel is delivered under pressure to the engine and so that vaporization of the fuel is reduced, the means for compressably pressurizing the fuel is a piston sealably mounted within the fuel tank, the piston dividing the fuel tank into a first variable volume chamber for containing the fuel, and a second variable volume chamber void of the fuel, with the position of the piston within the fuel tank determined by positioning means responsive to fuel pressure in the fuel tank and the fuel line.

* * * * *